No. 877,697. PATENTED JAN. 28, 1908.
A. C. & G. Q. BEDORTHA.
TREATMENT OF TOBACCO.
APPLICATION FILED AUG. 18, 1906.
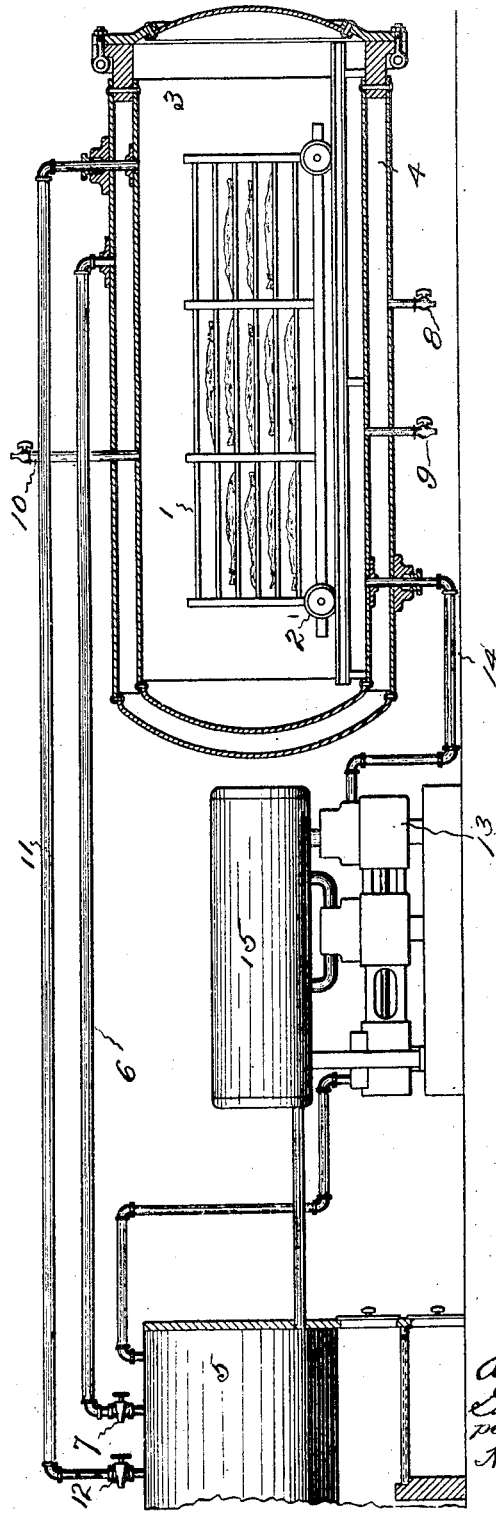

UNITED STATES PATENT OFFICE.

ALFRED C. BEDORTHA AND GEORGE Q. BEDORTHA, OF WINDSOR, CONNECTICUT.

TREATMENT OF TOBACCO.

No. 877,697.   Specification of Letters Patent.   Patented Jan. 28, 1908.

Application filed August 18, 1906. Serial No. 331,151.

*To all whom it may concern:*

Be it known that we, ALFRED C. BEDORTHA and GEORGE Q. BEDORTHA, citizens of the United States, residing at Windsor, in the county of Hartford and State of Connecticut, have invented a new and useful Treatment of Tobacco, of which the following is a specification.

This invention relates to a process of so treating tobacco which naturally has an inferior flavor that it will have a better or more esteemed flavor, and it pertains more particularly to the method of sterilizing or killing the spores and bacteria which originally develop and propagate on the leaf so that specially selected bacteria which are subsequently applied to produce the desired flavor will be free to develop without interference.

The object of the invention is to provide a simple process which will surely and completely kill all spores and bacteria originally existing on the tobacco leaves in a comparatively short time and at little expense, and which will leave the leaves in a desirable condition for the reception and development of the special bacteria subsequently applied to affect the flavor craved.

It is essential in order to attain the result sought to thoroughly sterilize the tobacco and free the leaves of all native spores and bacteria and obviate any reactions or oppositions, bacteriological and chemical, which would otherwise occur during subsequent fermentation between the original and the added bacteria, and the sterilizing must be continued sufficiently long and under such conditions that all native spores will be killed as well as the more sensitive bacteria.

In carrying out this improvement, leaves are shaken as much as they can be without danger of injury for the purpose of separating them and then the folds and pockets are further opened so the sterilizing medium can circulate freely about and reach all portions of the surface of every leaf, by the application of currents of warm dry air, after which the separated and opened leaves are subjected to the action of steam for such time and at such temperature as will kill all spores and bacteria and render the leaves absolutely sterile and in a receptive condition for the flavoring bacteria. This treatment can be carried out by various arrangements of common apparatus.

In the accompanying drawing, the essential features of one form of apparatus which can be employed are indicated in elevation.

The leaves of tobacco to be treated by this process are shaken so as to loosen them and then laid lightly on open racks and subjected to the action of warm dry currents of air. This may be done by placing the leaves in a kiln and drying them or laying them on a rack 1 mounted on a wheeled truck 2 and rolling the truck into a sterilizing chamber 3, as shown in the drawing. The sterilizer has an exterior steam jacket 4 connected with a boiler 5 by a pipe 6 having a controlling cock 7, for heating the sterilizing chamber. The steam jacket may have a drip cock 8 for drawing off all water of condensation and the sterilizing chamber may have a drip cock 9 for drawing off water and a pet cock 10 for the escape of air and vapor.

The loosely piled tobacco leaves are dried until the free moisture has evaporated and the leaves have separated and the folds open so that the sterilizing medium can circulate freely and come in contact with the entire surface of every leaf. The bunches with the leaves separated and opened in this manner are then subject to the action of the sterilizing agent sufficiently to kill all spores and bacteria.

The sterilizing chamber illustrated is connected with the boiler by a pipe 11 having a cock 12, and with an exhaust pump 13 by a pipe 14. The discharge of the pump is connected with a condenser 15 that is piped to the boiler. In the sterilizing chamber the leaves may be subjected to the action of steam at atmospheric pressure until the bacteria and spores are killed, or, to the action of steam at a pressure, of perhaps, ten pounds per square inch for perhaps ten minutes, and then the chamber may be exhausted by the pump, until a vacuum of, for instance, fifteen inches is attained. Steam may be again admitted. These steps may be repeated as many times as desired, but if the leaves are completely separated and unfolded, but one application of steam will be necessary.

The exact number of applications of steam, duration of the application, and degree of pressure are not essential to the invention as long as the spores and bacteria are completely killed.

After the leaves are completely sterilized and are cooled off bacteria or cultures thereof which will impart the characteristic flavor esteemed are applied to the leaves by spraying or otherwise, and the leaves thus infected are allowed to ferment in the usual way.

The manner of opening the leaves described herein is believed to be novel and it causes the leaves to separate and unfold so the sterilizing medium can have free access to all portions of the surface of the leaves without tearing them.

The invention claimed is:

1. The treatment of tobacco which consists in subjecting the leaves to a current of warm, dry air until all free moisture is removed, and then subjecting the leaves to the action of steam at a temperature above 212° Fahrenheit until the leaves are sterilized.

2. The treatment of tobacco which consists in drying the leaves and then sterilizing the leaves by subjecting them to the action of steam at a temperature above 212° Fahrenheit, and subsequently subjecting them to a partial vacuum and again to the action of steam.

3. The treatment of tobacco which consists in thoroughly drying the leaves, then sterilizing the same by subjecting them to the action of steam at a temperature above 212° Fahrenheit, and applying to the sterilized leaves cultures of selected bacteria.

4. The treatment of tobacco which consists in thoroughly drying it, submitting it to a partial vacuum and then to the action of steam at a temperature above 212° Fahrenheit.

ALFRED C. BEDORTHA.
GEO. Q. BEDORTHA.

Witnesses:
CHAS. T. WELCH,
GEORGE R. MAUDE.